United States Patent [19]

Chow

[11] 4,223,207
[45] Sep. 16, 1980

[54] APPARATUS FOR CONTROLLING THE POWER SUPPLIED TO A LOAD

[75] Inventor: Allan T. Chow, Wilmington, Del.

[73] Assignee: E. I. Du Pont de Nemours and Company, Wilmington, Del.

[21] Appl. No.: 880,945

[22] Filed: Feb. 24, 1978

[51] Int. Cl.² .......................... H05B 1/00; H05B 1/02
[52] U.S. Cl. ................................... 219/494; 219/497; 219/501; 219/482; 323/20; 323/102; 307/252 UA; 307/362
[58] Field of Search ............... 219/497, 494, 499, 485, 219/501, 490, 492; 323/19, 20, 102, 106; 307/252 UA, 252 B, 362

[56] References Cited

U.S. PATENT DOCUMENTS

| | | | |
|---|---|---|---|
| 3,177,336 | 4/1965 | Fischer | 219/497 X |
| 3,196,255 | 7/1965 | Beauchamp et al. | 219/497 |
| 3,336,531 | 8/1967 | Yamada | 328/155 |
| 3,440,517 | 4/1969 | Page et al. | 321/18 |
| 3,532,855 | 10/1970 | Van Cleave | 219/497 X |
| 3,553,428 | 1/1971 | McGhee | 219/501 |
| 3,715,651 | 2/1973 | Ott | 323/22 SC |
| 3,881,085 | 4/1975 | Traister | 219/501 |
| 3,891,931 | 6/1975 | Nougaret et al. | 323/22 SC |
| 4,004,214 | 1/1977 | Evans | 323/22 SC |
| 4,093,908 | 6/1978 | Evans | 323/19 |

FOREIGN PATENT DOCUMENTS

1348552  6/1979  France .................................. 323/22 SC

*Primary Examiner*—B. A. Reynolds
*Assistant Examiner*—M. Paschall

[57] ABSTRACT

The power control circuit described functions to vary the duty cycle of the alternating current signal supplied to the load. The duty cycle is varied by periodically generating a first signal, each half cycle of the alternating current signal, that is proportional to the actual power supplied to the load as a function of the duty cycle and wave form of the alternating current signal. A comparator compares this first with an error signal to vary the duty cycle in accordance with the power demanded by the error signal. The first signal is derived by evaluating the integral of the square of the voltage over each half cycle of the alternating current signal.

4 Claims, 3 Drawing Figures

APPARATUS FOR CONTROLLING THE POWER SUPPLIED TO A LOAD

DESCRIPTION

1. Technical Field

This invention relates to a circuit for controlling electrical power supplied to a load.

2. Background Art

Many devices have been developed over the years for the purpose of precisely controlling the power supplied to loads in accordance with a control or error signal. One use for such a device is that of controlling the temperature of an analytical instrument which is designed to heat a sample to a specified temperature. This heating may occur at a specified rate or may be maintained at some isothermal value. Unfortunately, the power supplied to the load may vary with fluctuations in the input line voltage or its wave shape. Any variations of this type cannot be tolerated since they introduce errors in the power supplied.

One solution to this problem is that described in U.S. Pat. No. 3,553,428 in which the power supplied to a load is controlled by monitoring the voltage supplied to the load. A voltage squaring circuit generates a control signal proportional to the average value of the square of the voltage and a proportional controller compares the control signal with an error signal, thus to control the power supplied to the load. While this approach represents a major advance over that of the prior art, it nevertheless relies only upon the average value of the square of the voltage and for this reason is somewhat limited in the degree of precision that can be obtained.

It is therefore an object of this invention to obviate many of the disadvantages of the prior art power controllers.

Another object of this invention is to provide an improved circuit for the precise control of power supplied to a load.

DISCLOSURE OF INVENTION

In accordance with the invention, a conventional power control circuit for controlling the electrical power supplied to a load from an alternating current source in accordance with an error signal, the circuit including a zero-crossover detector responsive to the alternating current signal for producing zero-crossover pulses corresponding to the zero-crossover times of said alternating current signal, and a control means responsive to the error signal and to the zero-crossover pulses for varying the duty cycle of the alternating current signal supplied to the load from the source, is improved by including in the control means a first means responsive to the alternating current signal for generating a first signal, each half cycle of said alternating current signal, proportional to the actual power that can be supplied to the load as a function of the duty cycle and the wave form of the alternating current signal, and comparator means for comparing the first signal with the error signal to vary the duty cycle thereby to vary the power actually spplied to the load.

In one aspect of the invention, the first means includes an alternating means for continuously evaluating the time integral of the square of the voltage of each half cycle of the alternating current signal, thereby to provide the first signal. This apparatus permits the precision control of the heater used in thermal analysis cells. To do this, the control circuit automatically compensates for variations in the line voltage and its wave form every half cycle.

BEST MODE FOR CARRYING OUT THE INVENTION

Figure 1:
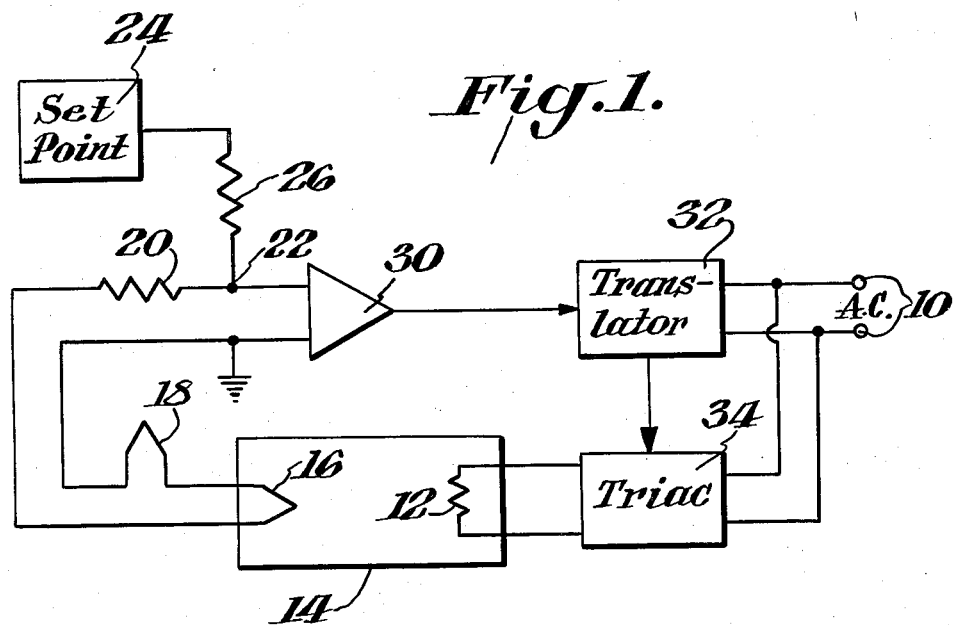
FIG. 1 is a blocak digram of a generalized form of a controller constructed in accordance with this invention.

There is shown in FIG. 1 a conventional power control circuit in which power from a source of alternating current potential 10 (line voltage) is supplied to a load 12, which in this instance is depicted as a resistive heating element. This element may be disposed in an oven 14, say of an analytical instrument. While the power is illustrated as being supplied to a resistive load, it is to be understood, that power may also be supplied to other type loads, such as and including electric motors and the like. The circuit also includes a sensing device 16, such as a sample thermocouple, which is disposed in the oven 14 to sense the temperature of the oven, which is the desired variable in the illustrated case. Other sensing devices, of course, would be used when other variables are being sensed.

In the case of a thermocouple 16, a reference junction 18 is provided so that a voltage proportional to the difference in temperature between the sample junction and the reference junction is transmitted through a resistor 20 to a summing junction 22. Also coupiled to this summing junction is a set point or reference signal derived from a set point device 24. This reference signal may be a fixed value or a programmed value designed to provide a set point or reference signal which varies in a manner in which it is desired to vary property to be controlled. This reference signal is passed through a resistor 26 to the summing junction 22. The summation signal is applied through an amplifier 30 to a translator 32. The translator 32, which may also be termed a controller, develops a trigger voltage signal which is passed to control an appropriate current switching device such as a triac 34, thereby to vary the duty cycle of the alternating current signal 10 that is applied to the load resistor 12. By varying the duty cycle, the power supplied to the load may be varied. This translator 32, in the prior art, usually included a zero-crossover detector and certain circuitry to vary the time, following each zero-crossover point, at which the triac 34 is switched on. In accordance with this invention, the translator 37 has been modified to provide switching pulses that occur in time as a function of not only the power that is to be supplied to the load but which also is a function of the wave form of the line voltage. Hence, power supplied to the load is precisely controlled.

Figure 2:
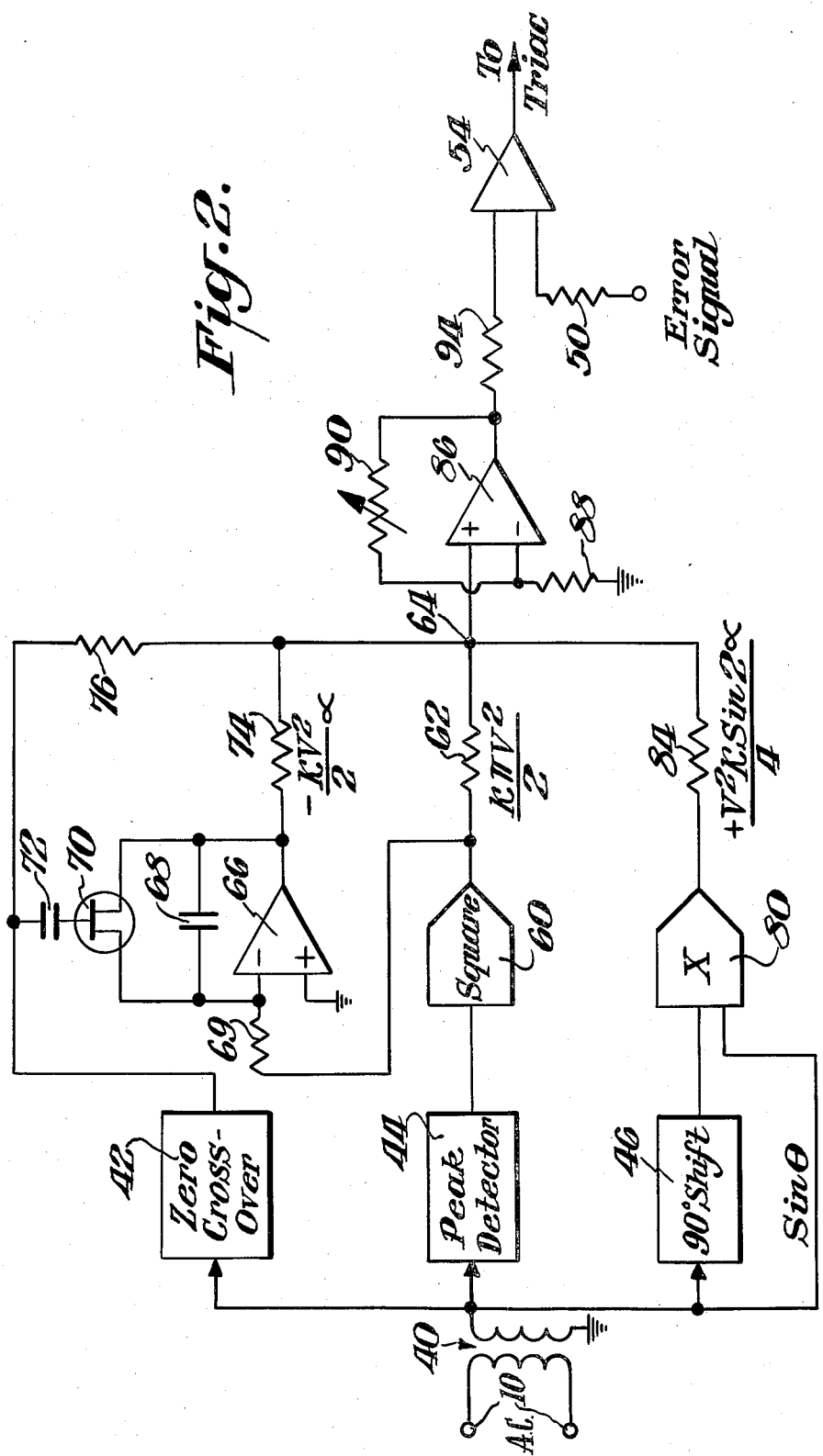
FIG. 2 is a partial block, partial schematic diagram of a controller, showing the details of the translator portion of the block diagram illustrated in FIG. 1, constructed in accordance with a preferred embodiment of this invention.

The details of this translator 32 are more clearly depicted in FIG. 2. In FIG. 2 the alternating current terminals 10 are coupled through a transformer 40 to a zero-crossover detector 42, a peak detector 44, and a 90° phase shift circuit 46. The conventional zero-crossover detector 42 provides a pulse output at each zero-crossing time of the alternating current wave form. The detector 44 may be of any conventiona type, such as that provided by any of the known integrated circuit chips or, for that matter, may be designed using transistors. The peak detector also may be conventional involving the standard series diode, bypass capacitor network. In like manner, the 90° phase shift circuit may be any of those used conventionally. These circuits do not form a part of this invention, and hence are not described in greater detail.

The outputs of these three circuits, 42, 44 and 46, are now applied to circuitry designed, in accordance with this invention, to effect the integration of the alternating current potential applied to the input terminals 10. This input signal is denoted by the formula V sine $\theta$, where V is the peak value of the alternating current signal and $\theta$ is the phase angle, which with each half cycle will vary between 0 and $\pi$. To determine the actual power supplied to the resistive load depicted in FIG. 1, since power is proportional to the square of the voltage in resistive loading.

$$P = K \int_{\alpha}^{\pi} (V \sin \theta)^2 d\theta$$

$$= KV^2 \int_{\alpha}^{\pi} \sin^2\theta \, dt =$$

$$= KV^2 \int_{\alpha}^{\pi} \tfrac{1}{2} [1 - \cos 2\theta] \, d\theta$$

$$= \frac{KV^2}{2} [\theta - \tfrac{1}{2} \sin 2\theta]_{\alpha}^{\pi}$$

$$= \frac{KV^2}{2} [\pi - \alpha + \tfrac{1}{2} \sin 2\alpha]$$

Figure 3:
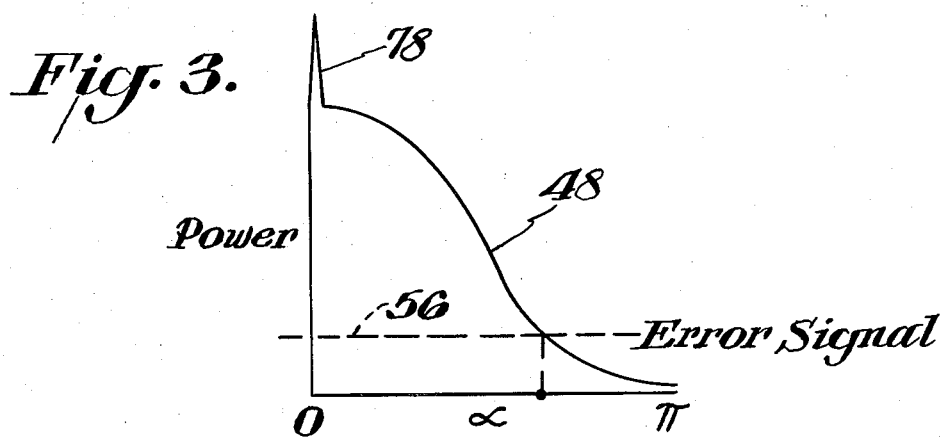
FIG. 3 is a wave form diagram in which the power supplied to a load is plotted against duty cycle to depict the manner in which power is controlled as a function of firing time of a switch.

In this derivation the angle $\alpha$ is the angle from the zero-crossover point to the point at which the actual firing of the triac occurs, such that the resulting wave form that will be generated by this circuit is depicted in FIG. 3 and represented by the curve 48. According to this curve, if the firing angle is early, i.e., $\alpha \approx 0°$, maximum power will be supplied to the resistive load whereas as the angle $\alpha$ increases up to $\pi$, the next zero-crossover point, the power will be steadily decreased in accordance with the Z shaped function 48. The error signal, indicating power demand for the load derived from the amplifier 30 (FIG. 1), is coupled through a resistor 50 to a comparator 54, whose second input terminal is the function 48. Thus, when the error signal depicted by the dashed line 56 (FIG. 3) equals the Z-shaped function 48, the comparator 54 supplies an output pulse to the triac 34 (FIG. 1) to turn this current switching device on so that the power supplied to the rest of that cycle will be that depicted by intersection of the error signal with the Z-shaped curve 48.

The generation of this curve, as noted, requires a near sinusoidal input signal and is accomplished by solving the integral depicted above. To do so, the first term of the integrated expression is derived by coupling the output of the peak detector 44 to a squaring circuit 60 whose output (K$\pi$V$^2$/2) is coupled through a summing resistor 62 to a summing junction 64 to provide the second term of the integrated expression. The output of the squaring circuit 60 is coupled through a resistor 69 to the negative input of a typical integrator which consists of an operational amplifier and a feedback capacitor 68. The integrating or feedback capacitor 68 for the integrator is shunted by switching transistor 70, in this case depicted as an FET transistor, coupled to receive the output of the zero-crossover detector 42 through an isolating capacitor 72. In this manner, the output of the integrator circuit provides the second term $(-KV^2 \alpha/2)$ through the resistor 74 to the summing junction 64.

To avoid problems, in the event the error signal exceeds the amplitude of the Z-shaped curve 48, the pulses from the zero-crossover detector 48 are also coupled through a resistor 76 to the summing junction 64, such that at the beginning of each cycle, the Z-shaped curve is modified by a sharp spike depicted at 78 (FIG. 3). This ensures triggering at or close to the zero-crossover point, in the event of a very large error signal, such that maximum power is supplied to the load.

Finally, the third term of the integrated expression is supplied by coupling the output of the 90° phase shift circuit 46 together with the alternating current potential, which represents sin $\theta$, to the inputs of a multiplier circuit 80. The output of this circuit is the term $(+V^2K/4 \sin 2\alpha)$. This output signal is coupled through a resistor 84 to the summing junction 64. This summing junction is coupled through an amplifier 86, the other input of which is grounded through a resistor 88. The output of the amplifier is connected back through an adjustable resistor 90 to determine the gain value which is the ratio of the resistive values of 90 and 88. In this manner, the summed output representing the instantaneous power available to the load depending upon firing at a particular angle, i.e., the Z-curve 48. This output, or Z curve, is coupled through a resistor 94 to one input of the comparator 54, which, as noted, is compared with the error signal from the amplifier 30 (FIG. 1).

It is thus apparent that when comparison is achieved, an output pulse signal is applied to the triac 34, which effects gating at the proper time position during each half cycle of the alternating current input signal. This apparatus is thus seen to afford the possibility accounting for variances in the wave form, variances in line voltage, and yet providing a precise power output to a load simply by controlling the firing angle of a switching device. This makes this apparatus particularly useful for the precision heater control of thermal analysis cells, for example. The apparatus provides automatic compensation for voltage variation such that a dynamic range of a seven fold supply line voltage change can be handled.

In an alternative embodiment of the invention, the translator 32 depicted in FIG. 1 may be in the form of a microcomputer coupled with a read only memory (ROM) in which a sine look up table is stored in the memory in synchronism with the alternating current signal and using a peak detector for supplying the peak voltage to the microcomputer. The function V$^2$ Sin$^2$ $\theta$ may be integrated by successive approximation. In this manner, the same Z-shaped curve is generated which may be applied to the comparator 54 for control of the firing point of the triac.

Still another embodiment of the invention is a microcomputer that can be used to compute a series representing the function V$^2$ Sin$^2$ $\theta$ such that the interval is computed on a real time basis in synchronism with the wave form. This output signal which correlates to the Z-shaped curve 48 again may be coupled to the comparator 54 for control of the firing angle.

All of these approaches have the unique advantage of providing a precision control that varies as a function of actual line voltage and provides a very precisely controlled amount of power to a load in accordance with an error signal.

I claim:

1. In a power control circuit for controlling the electrical power supplied to a load from an alternating current source in accordance with an error signal, said circuit including a zero-crossover detector responsive to said alternating current signal for producing zero-crossover pulses corresponding to the zero-crossover times of said signal, and a control means responsive to said error signal and said zero-crossover pulses for varying the duty cycle of said alternating current signal supplied to said load from said source, the improvement wherein said control means includes first means responsive to said alternating current signal for generating a first signal, each half cycle of said alternating current signal, proportional to the actual power that can be supplied to said load as a function of the duty cycle and actual wave form of said alternating current signal, switching means coupled between said load and said alternating current source, and comparator means for comparing said first signal with said error signal to vary said duty cycle, said comparator means functioning to vary the firing angle of said switching means thereby to vary the power actually supplied to said load, said first means also including evaluating means for continuously evaluating the time integral of the square of the voltage of each half cycle of said alternating current signal, thereby to provide said first signal.

2. A control circuit according to claim 1 wherein said evaluating means includes:

a peak detector for detecting the peak voltage of said alternating current signal, a squaring circuit coupled to said peak detector for squaring said peak voltage to provide a squared signal, an integrator coupled to said squaring circuit for integrating said squared signal to provide an integrated squared signal, a trigonometric function generating circuit for generating a sin $2\theta$ signal where $\theta$ varies from 0 to $\pi$ during each half cycle of said alternating current signal, a switch coupled to said zero-crossover detector for resetting said integrator every zero-crossover time of said alternating current signal, and adder means for continuously combining said squared signal, said integrated squared signal, and said sin $2\theta$ signal.

3. In a power control circuit for controlling the electrical power supplied to a load from an alternating current source in accordance with an error signal, said circuit including a zero-crossover detector responsive to said alternating current signal for producing zero-crossover pulses corresponding to the zero-crossover times of said signal, and a control means responsive to said error signal and said zero-crossover pulses for varying the duty cycle of said alternating current signal supplied to said load from said source, the improvement wherein said control means includes first means responsive to said alternating current signal for generating a first signal, each half cycle of said alternating current signal, proportional to the actual power that can be supplied to said load as a function of the duty cycle and wave form of said alternating current signal, and comparator means for comparing said first signal with said error signal to vary said duty cycle, thereby to vary the power actually supplied to said load, said first means also includes evaluating means for continuously evaluating the integral of the square of the voltage of each half cycle of said alternating current signal, thereby to provide said first signal.

4. In a power control circuit for controlling the electrical power supplied to a load from an alternating current source in accordance with an error signal, said circuit including a zero-crossover detector responsive to said alternating current signal for producing zero-crossover pulses corresponding to the zero-crossover times of said signal, and a control means responsive to said error signal and said zero-crossover pulses for varying the duty cycle of said alternating current signal supplied to said load from said source, the improvement wherein said control means includes first means responsive to said alternating current signal for generating a first signal, each half cycle of said alternating current signal, proportional to the actual power that can be supplied to said load as a function of the duty cycle and actual wave form of said alternating current signal, switching means coupled between said load and said alternating current source, and comparator means for comparing said first signal with said error signal to vary said duty cycle, said comparator means functioning to vary the firing angle of said switching means thereby to vary the power actually supplied to said load, said first means including means for generating a trigonometric sine function in synchronism with said alternating current signal and means responsive to said generating means for integrating the square of the product of said alternating current signal and said sine function each half cycle of said alternating current signal.

* * * * *